(12) United States Patent
Greb et al.

(10) Patent No.: US 11,043,797 B2
(45) Date of Patent: Jun. 22, 2021

(54) CABLE FITTING FOR HVDC CABLES

(71) Applicant: Merck Patent GmbH, Darmstadt (DE)

(72) Inventors: Marco Greb, Linsengericht (DE); Johann Bauer, Darmstadt (DE); Norbert Kurda, Berlin (DE)

(73) Assignee: Merck Patent GmbH

( * ) Notice: Subject to any disclaimer, the term of this patent is extended or adjusted under 35 U.S.C. 154(b) by 0 days.

(21) Appl. No.: 16/625,088

(22) PCT Filed: Jun. 22, 2018

(86) PCT No.: PCT/EP2018/066711
§ 371 (c)(1),
(2) Date: Dec. 20, 2019

(87) PCT Pub. No.: WO2018/234522
PCT Pub. Date: Dec. 27, 2018

(65) Prior Publication Data
US 2020/0169075 A1    May 28, 2020

(30) Foreign Application Priority Data

Jun. 23, 2017  (EP) ..................... 17177580

(51) Int. Cl.
*H02G 15/103* (2006.01)
*B29C 45/00* (2006.01)
(Continued)

(52) U.S. Cl.
CPC ....... *H02G 15/103* (2013.01); *B29C 45/0001* (2013.01); *H01B 1/24* (2013.01);
(Continued)

(58) Field of Classification Search
CPC .... H02G 1/145; H02G 15/103; H02G 15/184; H02G 15/24; H01B 1/24; H01B 3/28
(Continued)

(56) References Cited

U.S. PATENT DOCUMENTS 5,801,332 A * 9/1998 Berger ................. H02G 15/103
174/73.1
7,170,004 B2    1/2007 Gramespacher et al.
(Continued)

FOREIGN PATENT DOCUMENTS

DE    19746313 A1    4/1999
DE    3 304 561 A1 * 12/2014 .............. C08L 83/08
(Continued)

OTHER PUBLICATIONS

J. Ackermann; V. Damrath: "Chemie und Technologie der Silicone II, Chemie in unserer Zeit", vol. 23, 1989, VCH Verlagsgesellschaft MBH, pp. 86-99.
(Continued)

*Primary Examiner* — William H. Mayo, III
(74) *Attorney, Agent, or Firm* — Millen, White, Zelano and Branigan, P.C.

(57) ABSTRACT

A cable fitting for cables that can be used for high-voltage direct-current (HVDC) energy transmission, the cable fitting having an electrically insulating layer. A process for the production of an electrically insulating layer of such a cable fitting, and also the use thereof.

20 Claims, 1 Drawing Sheet

(51) Int. Cl.
  *H01B 1/24* (2006.01)
  *H01B 3/28* (2006.01)
  *H02G 1/14* (2006.01)
  *H02G 15/184* (2006.01)
  *H02G 15/24* (2006.01)

(52) U.S. Cl.
  CPC .............. *H01B 3/28* (2013.01); *H02G 1/145* (2013.01); *H02G 15/184* (2013.01); *H02G 15/24* (2013.01)

(58) Field of Classification Search
  USPC ................ 174/74 R, 78, 79, 84 R, 88 R, 93
  See application file for complete search history.

(56) References Cited

U.S. PATENT DOCUMENTS

| | | | |
|---|---|---|---|
| 8,071,118 | B2 | 12/2011 | DiBenedetto et al. |
| 10,250,021 | B2 | 4/2019 | Meier et al. |
| 2004/0097131 | A1* | 5/2004 | Varreng ............... H01R 13/523 439/587 |
| 2005/0139373 | A1* | 6/2005 | Gramespacher ..... H02G 15/068 174/74 R |
| 2018/0145554 | A1 | 5/2018 | Lang et al. |

FOREIGN PATENT DOCUMENTS

| | | |
|---|---|---|
| DE | 102015209594 A1 | 12/2016 |
| EP | 1337022 A1 | 8/2003 |
| EP | 2026438 A1 | 2/2009 |
| EP | 3034561 B1 | 2/2019 |
| WO | 0074191 A1 | 12/2000 |
| WO | 03035124 A2 | 5/2003 |
| WO | 16096276 A1 | 6/2016 |

OTHER PUBLICATIONS

B. Pachaly; F. Achenbach: "Silicone; aus Winnacker/Küchler: Chemische Technik: Prozesse und Produkte", vol. 5, 2005, Wiley VCH, pp. 1095-1213 (two parts).

International Search Report PCT/EP2018/066711 dated Sep. 19, 2018 (pp. 1-5).

* cited by examiner

US 11,043,797 B2

CABLE FITTING FOR HVDC CABLES

BACKGROUND OF THE INVENTION

(1) Field of the Invention

The present invention relates to a cable fitting for cables that can be used for high-voltage direct-current (HVDC) electrical energy transmission, where the cable fitting has an electrically insulating layer, to a process for the production of an electrically insulating layer of such a cable fitting, and also to use thereof.

With the sharp increase in global energy requirement, there is an urgent need for capability to minimize losses during transportation of large quantities of energy over large distances. Transmission of electrical energy in the high-voltage sector over relatively large distances has hitherto been achieved by way of alternating-current (HVAC) cables which incur large losses. Appropriate technologies have been used for many decades, have been well researched, and employed worldwide.

The constant increase of power densities and transmission rates in the international energy market has led to a requirement for energy transmission methods that generate significantly smaller power losses than alternating-current transmission. Increasing efforts are therefore made to find methods for direct-current transmission, because this reduces power loss. However, there are stringent requirements relating to the technology per se and in particular to the materials used.

With the possibility that HVDC networks will be expanded worldwide, major efforts have been made in recent years to develop reliable high-performance direct-current systems. Knowledge and technologies derived from alternating-current transmission are valuable for this development, but are not entirely transferrable.

In particular, the materials used in the insulators in cable fittings do not yet adequately meet the requirements placed upon insulation that performs well on exposure to high-voltage DC fields.

The DC field causes long-term polarization of the insulation material, with identical orientation. The conductive layers of the main conductor (core) and the outer conductor (earth potential) of a cable inject space charges into the insulation system of the cable and of the cable fitting. Unlike in alternating-current (AC) systems, these space charges are not subsequently eliminated by reverse polarization, but instead accumulate over time and penetrate further into the material. Defects in the material, for example contaminants, inclusions or gas bubbles, lead to local concentration of the space charges, which can increase to the extent that the insulation system fails and partial discharges occur. These effects are amplified as the applied voltage increases. If the resultant problem is already critical with voltages of 320 or 525 kV that are currently conventional, significantly greater problems can be expected in respect of failure of insulation layers at network voltages of 840 kV or 1100 kV that are currently being trialled. In particular in cable fittings, which include cable sleeves, cable end seals, cable plugs and cable bushings, which represent spatial breaks in the cable network, the risk of substantial partial discharges is high unless provision is made for regular dissipation of space charges or measures are adopted to counter the development of space charges, thus preventing accumulation thereof.

The insulators in direct-current high-voltage transmission systems (hereinafter: HVDC systems) are intended to have an insulation resistance that is high under normal conditions but can be reduced to a lower insulation resistance as required in order to dissipate space charges.

(2) Background Art

WO 00/74191 A1 describes a method for the geometric control of the electrical field in cable sleeves or cable end seals of HVDC systems, where a resistively field-controlling layer of a cable has contact with a stress cone which can, when necessary, distribute the electrical field of the conductive cable ends more uniformly over a broad region, thus reducing or avoiding local overloads (e.g. field peaks, excessive field intensities, space charges).

Geometric field-control elements for cables sleeves or cable end seals are also known from the patent literature for alternating-current high-voltage systems (hereinafter: AC systems), and are described by way of example in DE 197 46 313 A1. They have long been a proven means of controlling excessive field intensities between the end of the insulation layer of the cable and the uncovered electrical conductor in the cable sleeve, but they do not overcome the problems described above that can arise within the actual insulation.

Cable fittings are often produced mainly from elastomers. These allow use of a method in which, by way of example, cable sleeves are pushed onto, or shrink onto, the cable end requiring connection. Successful conclusion of the push-on procedure for assembly of the said components requires expansion of the component by from 15 to 35% of its outer dimensions, with capability for complete recovery of shape. Cable fittings consisting of many different materials and rigid inserts can become less effective during expansion in this assembly procedure, by virtue of different susceptibility of individual constituents for expansion, and displacement of inserts. The interfaces between the individual layers of the cable fittings, which generally have a multilayer structure, are also adversely affected by the expansion process, in exactly the same way as by high operating temperatures up to 95° C., and become less effective. By way of example, air inclusions between a conductive layer and an insulation layer can cause partial discharging.

There has therefore been no lack of attempts to provide cable fittings for high-voltage direct-current transmission that consist essentially of an elastomeric material and in which effective field control is not achieved by way of geometric inserts.

EP 2 026 438 A1 discloses an HVDC cable sleeve which comprises an electrically insulating body into which, at least to some extent, a field-controlling layer has been incorporated, where the field-controlling layer thickens in certain subregions. The electrically insulating body in that document consists of an elastomer, which can be EPDM (Ethylene-Propylene-Diene monomer) or a silicone elastomer. Incorporated into the field-controlling layer, the matrix of which can likewise be composed of EPDM or silicone elastomer, there is a field-controlling material with non-linear field-controlling properties, consisting of ZnO particles or of SiC particles.

WO 2016/096276 A1 also discloses an HVDC cable sleeve which has a multilayer structure and has both an insulating layer and a field-controlling layer, where the field-controlling layer comprises non-linearly field-controlling particulate material. The latter consists either of known spherical ZnO microvaristor particles which have been doped with various metal oxides, for example $Sb_2O_3$, $Bi_2O_3$, $Cr_2O_3$ or $Co_3O_4$ and then sintered, or of silicon carbide particles (SiC). In that document it is possible that the insulating layer and the matrix of the field-controlling layer consist of different elastomers.

The ZnO microvaristor particles mentioned have high density and are therefore difficult to process in the elastomeric precursor compounds that require crosslinking, because during processing they sink within the, as yet uncrosslinked, composition and therefore cannot be uniformly distributed therein; it is thus very difficult to avoid formation of a gradient in the resultant field-controlling layer. The resultant filled component moreover has relatively high weight. Although SiC particles have a lower density, they have significantly poorer adjustability of field-controlling properties in comparison with the ZnO microvaristor particles. The patents described above moreover respectively require a purely insulating layer and additionally a field-controlling layer, in order to ensure provision of the desired insulating and field-controlling properties. However, as already described above, interfaces between different layers in cable fittings can generally become points of weakness which can reduce performance in respect of electrically insulating properties, and it would therefore be advantageous to have access to cable fittings which have only a reduced extent of such points of weakness in structure and in processability.

BRIEF SUMMARY OF THE INVENTION

The object of the present invention accordingly consists in providing an HVDC cable fitting which does not have the disadvantages described in respect of processability and effectiveness of insulating and field-controlling elements, and which can be produced in cost-effective manner with use of the known elastomeric matrix materials.

A further object of the invention consists in providing a process for the production of an electrically insulating layer of a HVDC cable fitting which simultaneously has electrically insulating and field-controlling properties.

An additional object of the invention moreover consists in indicating the use of an electrically insulating layer produced as above.

The object of the present invention is achieved via a cable fitting for HVDC cables, comprising a moulding which has multilayer structure and which has an electrically insulating layer that comprises an elastomer and that comprises a field-controlling particulate filler, where the field-controlling particulate filler is metal-oxide-containing core-shell particles.

The object of the invention is moreover also achieved via a process for the production of an electrically insulating layer of an HVDC cable fitting, where
    an unhardened elastomer-precursor composition, a crosslinking agent and a field-controlling particulate filler which comprises metal-oxide-containing core-shell particles are homogeneously mixed with one another, and also optionally further additives, to give an insulation-layer-precursor composition,
    the insulation-layer-precursor composition is introduced into a hollow body which has a cavity with an exterior shape corresponding to the shape of the electrically insulating layer of a cable fitting, and
    the insulation-layer-precursor composition is hardened in a crosslinking manner by passage of time or introduction of heat and/or of high-energy radiation, and the resultant insulation layer is removed from the hollow body.

The object of the invention is moreover also achieved via the use of the electrically insulating layer produced above as insulating layer in an HVDC cable fitting, which is a cable sleeve, a cable end seal, a cable plug or a cable bushing.

Irrespective of whether HVDC cable fittings are cable sleeves, cable end seals, cable plugs or cable bushings, they are generally mouldings with a multilayer structure and mostly comprise, viewed from the cable surface or from the inner side of the cable fitting, insulation and an outer conductive layer (earth potential). When geometric field control is used, there are moreover frequently electrically conducting deflectors incorporated.

In the case of the cable fittings described above according to EP 2 026 438 A1 and WO 2016/096276 A1, in contrast, the field-control function of the deflectors is respectively assumed by a field-controlling layer which has been directly applied on the insulation (on the insulation layer) and which comprises field-controlling particulate materials.

DETAILED DESCRIPTION OF THE INVENTION

Unlike in these embodiments of the prior art, the HVDC cable fitting of the invention merely has at least one electrically insulating layer and one outer conductive layer, where the electrically insulating layer comprises an elastomer and a field-controlling particulate filler, and the latter is metal-oxide-containing core-shell particles. Surprisingly, the inventors of the present invention have found that it is possible to omit incorporation of electrically conductive deflectors or of a separate field-control layer in addition to an insulating layer in HVDC cable fittings if the insulating layer itself comprises a field-controlling particulate filler of a certain composition in homogeneous distribution. It is therefore preferable that the cable fitting of the invention does not have any field-controlling electrically conductive inserts (e.g. deflectors) or any separate field-controlling layer in addition to the electrically insulating layer of the invention. There is no intention here to describe, or provide any more detailed explanation of, further constituents of an HVDC cable fitting that consist by way of example of additional mechanical protective layers, moisture barriers, etc., and are conventional in the art, because incorporation of those into an HVDC cable fitting is general technology knowledge possessed by the person skilled in the art, and the said constituents can therefore be added appropriately as required in accordance with the art.

The more detailed description hereinafter therefore applies only to the electrically insulating layer composed according to the invention for an HVDC cable fitting.

The electrically insulating layer of the HVDC cable fitting of the invention in essence comprises an elastomeric material, and also a field-controlling particulate filler, which is metal-oxide-containing core-shell particles. According to the invention, the field-controlling particulate material here has homogeneous distribution in the elastomeric material.

The elastomeric material is preferably an elastomer that is usually used for the insulation or insulation layers of cable fittings, i.e. a suitable silicone rubber, or else a polyurethane or EPDM.

It is preferable to use silicone rubber, because this material has major advantages in relation to its extensibility, elasticity, tensile strength and gas permeability, in particular for HVDC cable fittings intended for application to the appropriate HVDC cables by the push-on method. Electrically insulating layers based on silicone are moreover more effective than, for example, electrically insulating layers based on EPDM in smoothing temperature variations and unevenness on the cable wire surface.

In particular, the silicone rubber is a silicone rubber that is crosslinked at low temperature (from room temperature to <200° C., comprising two components) known as RTV2 silicone, a silicone rubber that is crosslinked at higher temperatures (starting at about 110° C., comprising two components, or starting at about 160° C., comprising one component) known as HTV silicone, or a liquid-crosslinked silicone rubber (starting at about 110° C., comprising two components) known as LSR silicone.

Materials of these types are already used for cable fittings, in sectors including HVDC, and are obtainable commercially, for example from Wacker Chemie, Momentive or Dow Corning, Inc.

They are reactive silicone compounds which are mostly polymerized with platinum complexes as catalysts, materials that can be added to the starting compounds for the purposes of the polymerization reaction being organosilicon compounds as crosslinking agents and, if necessary, also auxiliaries such as inert fillers, colour pigments, reinforcing fillers or other specific additives. An overview of suitable silicone rubber compounds can be found in J. Ackermann, V. Damrath, *Chemie and Technologie der Silicone II [Chemistry and Technology of the Silicones II]*, Chemie in unserer Zeit [*Chemistry in our time*], Volume 23, 1989, *No.* 3, pp. 86-99, *VCH Verlagsgesellschaft mbH*, Weinheim, or else B. Pachaly, F. Achenbach et. al., *Silicone [Silicones]*; from Winnacker/Küchler: *Chemische Technik: Prozesse and Produkte [Chemical Technology: Processes and Products]*, Volume 5, pp. 1095-1213, Weinheim, WILEY VCH, 2005.

According to the invention, metal-oxide-containing core-shell particles are used as particulate field-controlling filler. For the field-controlling properties of these particles, it is necessary that either the core or the shell, or the core and the shell, of these particles comprise(s) at least one electrically conductive or electrically semiconductive metal oxide.

The electrically conductive or electrically semiconductive metal oxides can be doped metal oxides, metal suboxides or oxygen-deficient metal oxides.

The following are in particular used as metals for electrically conductive or semiconductive metal oxides, i.e. oxides, mixed oxides or oxide mixtures: zinc, tin, germanium, titanium, gallium, indium, antimony, silicon, tungsten, molybdenum, lead, cadmium, calcium, strontium, barium, copper and rhenium.

The metal oxides, individually or in the form of single-phase mixed oxide, can be doped with one or more materials from the group consisting of antimony, indium, tungsten, molybdenum, chromium, cobalt, manganese, iron, cadmium, gallium, germanium, tin, vanadium, niobium, tantalum, cerium, scandium, lanthanum, yttrium, bismuth, titanium, copper, calcium, strontium, barium, aluminium, arsenic, phosphorus, nitrogen, boron, fluorine and chlorine.

The doping elements are generally not the same as the metal of the metal oxide. However, in particular cases there can also be identical metal centres present with different oxidation states in a doped metal oxide or metal mixed oxide.

The following are particularly preferrably used as metal oxides: tin oxide, zinc oxide, indium oxide and/or titanium oxide, in particular titanium dioxide. The following are preferably used as doping substances: aluminium, indium, fluorine, tungsten, tin and/or antimony, chromium, cobalt, vanadium, niobium and tantalum. Adjuvants such as bismuth, cerium, boron, chromium, silicon, strontium, barium or calcium can also be added for further adjustment to the properties of the material.

The proportion of the doping substances in the electrically conductive or semiconductive core, or in the electrically conductive or semiconductive shell, of the core-shell particles can be from 0.01 to 30% by weight, based in each case on the weight of the core or of the shell. It is particularly preferable to use antimony-doped tin oxide, tungsten-doped tin oxide, tin-doped indium oxide, aluminium-doped zinc oxide or fluorine- and/or phosphorus-doped tin oxide. However, titanium oxide doped with niobium or with tantalum, with molybdenum or with tungsten, and with other transition elements, is also advantageously used as semiconductive material. The percentage doping proportion here determines the magnitude of the electrically conductive or electrically semiconductive properties. The smaller the proportion of the doping element, the lower the expected electrical conductivity. It is thus possible to use the same metal oxide/doping element combination to vary the electrically conductive properties of the core or of the shell from significantly semiconductive to highly electrically conductive. The non-linear electrical properties of materials can be adjusted by way of the further abovementioned adjuvants and the annealing conditions.

The use according to the invention of core-shell particles permits fine adjustment of the electrically conductive properties of the particulate filler material of the electrically insulating layer of the HVDC cable fitting. The metal oxides described above permit adjustment of the electrically conductive properties in the core or in the shell. However, core or shell can also consist of dielectric material if the respective other portion of the particle consists of an electrically conductive or semiconductive material. By way of example, in an advantageous use of core-shell particles, the core consists of a dielectric material which by way of example is selected from $SiO_2$, $TiO_2$, $Al_2O_3$, glass, or synthetic or naturally occurring aluminosilicates such as mullite, perlite, pumice stone, fly ash or phyllosilicates such as natural or synthetic mica, talc, sericite and mixtures of at least two of these, while the shell comprises an electrically conductive or semiconductive metal oxide as described above. Equally, electrically conductive cores consisting of particles of the electrically conductive or semiconductive metal oxides described above can have a surrounding shell made of a dielectric material such as $SiO_2$, $Al_2O_3$, $TiO_2$ or of polymers such as PVDF (polyvinylidene fluoride) or of polymeric functional siloxanes, which provides intrinsic electrical conductivity to the core-shell particles, while the core-shell particles in the form of powder are not necessarily themselves electrically conductive.

The structure of the core-shell particles used according to the invention moreover also allows targeted control of the density of the individual particles, this being in particular advantageous for processing properties during the production of the insulation layer, or of the insulation, of the HVDC cable fitting, and by way of example being essential for enabling homogeneous distribution of core-shell particles in the elastomer. It is therefore preferable according to the invention to select core-shell particles of density below 5 $g/cm^3$, in particular below 4 $g/cm^3$. In comparison with the ZnO microvaristors used in the prior art, these core-shell particles have the advantage that their tendency towards settlement in the as yet unhardened (as yet uncrosslinked) insulation-layer-precursor composition during the production process is significantly smaller; they can therefore be homogeneously incorporated therein, and this homogeneous distribution is retained despite the mechanical stressing of the uncrosslinked insulation-layer-precursor during the process to produce the cable fitting, and even after crosslinking thereof. The weight of the finished component is moreover significantly reduced in comparison with a component filled with the same proportion by volume of ZnO microvaristors.

Advantageously electrically conductive properties of the core-shell particles used according to the invention can be combined particularly effectively with an advantageous density if the core of the particles consists of a dielectric material and the shell comprises at least one electrically conductive or semiconductive metal oxide. It is possible here to use particulate cores of low density which are advantageously obtainable commercially and are chemically inert, for example particles made of $SiO_2$, $TiO_2$, $Al_2O_3$, glass, or particularly preferably of synthetic or naturally occurring aluminosilicates such as mullite, perlite, pumice stone, fly ash or phyllosilicates such as natural or synthetic mica, talc, sericite or a mixture of at least two of these. If these are added as cores of the core-shell particles, this leads to a wide range of possible variations for the configuration of the properties of the shell in respect of materials and electrical conductivity, without any excessive density of the final core-shell particles leading to undesired processing properties during the production of the insulation layers of cable fittings.

The core-shell particles used in the invention can have various shapes, i.e. spherical, lamellar or acicular particles are suitable, as also are irregularly shaped particles and mixtures of two or more of these.

The shape of the core-shell particles here depends very substantially on the shape of the respective particulate core material. By way of example, core-shell particles based on lamellar mica or talc as core have a lamellar shape, because the shell of the core-shell particles encloses the core, adhering securing thereto, and mostly takes the form of very substantially uniform coating on the core, and therefore the shape of the core material also corresponds to the external shape of the core-shell particles.

The size of the core-shell particles is in the range from 0.1 to 150 μm, preferably in the range from 0.5 to 100 μm and in particular in the range from 1 to 80 μm. Particle size is considered according to the invention to be the greatest longitudinal dimension of the individual particles.

The particle size can be determined here by conventional methods for particle size determination. In particular, preference is given to particle size determination by the laser diffraction method, which advantageously can determine both the nominal size of the individual particles and also their percentage particle size distribution. Measurement equipment is available from various companies for this purpose, an example being a Mastersizer 3000 from Malvern Instruments Ltd., or an Accusizer 780 from Agilent Technologies. All of the particle size determinations carried out in the present invention are determined by the laser diffraction method with Malvern Mastersizer 3000 equipment from Malvern Instruments Ltd., UK, in accordance with standard conditions in ISO/DIS 13320.

If the shape of the core-shell particles used is lamellar, the thickness of the corresponding particles is in the range from 0.01 to 5 μm, in particular from 0.05 to 4.5 μm. The shape factor of the lamellar particles (ratio of diameter or particle size to thickness) is from 2:1 to 2000:1, in particular from 5:1 to 200:1.

If the core-shell particles have a dielectric core and a shell in the shape of a coating made of an electrically conductive or semiconductive metal oxide, the thickness of the shell (coating) on the core is generally from 10 to 200 nm, preferably from 20 to 50 nm. The proportion by weight of the shell can be from 30 to 200% by weight, preferably from 50 to 150% by weight, based on the weight of the core.

The core-shell particles used according to the invention for field control in the electrically insulating layer of an HVDC cable fitting have, determined by the materials in their composition, electrical conductivity, intrinsic electrical conductivity or semiconductive properties.

Because the insulating layer, or, respectively, the insulating moulding which comprises the elastomer and which comprises the core-shell particles is intended overall to have electrically insulating properties, it is clear that in particular it is not permissible to use electrically conductive core-shell particles in the layer (the moulding) in a concentration above the percolation threshold.

The percolation threshold of a system of electrically conductive particles in a dielectric matrix is a narrow range of concentration for the electrically conductive particles within which the electrically conductive properties of the matrix undergo a sudden change, i.e. formation of conductive pathways causes the overall system to achieve a sudden increase of electrical conductivity by several orders of magnitude for a small increase in concentration of electrically conductive particles.

In order to adjust the insulation resistance of the electrically insulating layer in the HVDC cable fitting of the invention to a value that under conditions of stress is in the range of about $10^8$ to $10^{12}$ ohm*cm, electrically conductive core-shell particles can be used in the elastomer only in a low concentration significantly below the percolation threshold, namely in the range from 0.1 to 10% by volume, preferably from 0.5 to 6% by volume, based on the volume of the insulation layer or of the insulation.

For intrinsically conductive or semiconductive core-shell particles, higher concentrations are permissible and advantageous, in the range from 0.1 to 25% by volume for intrinsically conductive core-shell particles and in the range from 0.1 to 25% by volume, in particular from 0.5 to 15% by volume, for semiconductive core-shell particles.

The concentration of the core-shell particles in the elastomer is generally from 0.1 to 25% by volume, preferably from 0.5 to 20% by volume and in particular from 1 to 15% by volume, based on the volume of the insulation layer or of the insulation.

In so far as no other solid particles are present in the elastomer, the concentration of the core-shell particles can be identified as concentration of pigment by volume. This is the ratio of the total volume of pigments and/or fillers and/or other non-film-forming solid particles in a product to the total volume of the nonvolatile fractions, expressed in percent.

It is particularly preferable according to the invention to use semiconductive core-shell particles having a powder resistivity in the range from $10^6$ ohm*cm to $10^{12}$ ohm*cm. The powder resistivity of the semiconductive core-shell particles is preferably in the range from $10^8$ to $10^{12}$ ohm*cm, where the stated values are based on an applied measurement voltage of 100 V. They can be used in the same way as the abovementioned electrically conductive or intrinsically conductive pigments, i.e. individually or in the form of mixtures of variously composed core-shell particles which by way of example differ from one another in their powder resistivity; it is thus easily possible to ensure fine adjustment of the desired dissipation properties in the insulating layer via mixing of core-shell particles.

Again, the semiconductive core-shell particles are preferably used in a concentration below the percolation threshold.

The electrical properties of the core-shell particles are characterized via the powder resistivity. The resistivity of a pigment powder is measured by charging a small quantity (about 0.5 to 3 g) of the pigment powder formed according to the invention by the core-shell particles mentioned to a Perspex tube of internal diameter 2 cm, and using a metal ram, with the aid of a 10 kg weight, for compression against a metal electrode. The resistivity ρ is obtained from the layer thickness L of the compressed powder by the following relationship:

$$\rho = R * \pi * (d/2)^2 / L \text{ (ohm*cm)}.$$

R here is the actual electrical resistance measured at a measurement voltage of 100 V, and d is the diameter of the pigment column.

There can also be, provided on the surface of the core-shell particles used according to the invention, an additional subsequent organic or inorganic coating, intended to improve those properties of the core-shell particles that relate to incorporation into the elastomer. By way of example, there can be, provided to the surface of the core-shell particles, a thin coating made of organic silanes or amphiphilic surfactants. However, the surface coating here represents only a proportion of at most 5% by weight, based on the total weight of the core-shell particles, and causes only little, or preferably no, impairment of the electrical conductivity of the core-shell particles.

Suitable electrically conductive, intrinsically conductive or semiconductor core-shell particles are obtainable commercially, a large selection being available by way of example as Iriotec® from Merck KGaA, Germany. Core-shell particles which have proved to be particularly suitable among these are those available as Iriotec® 73xx (xx=10, 15, 20, 25, 30, 40) and Iriotec® 75xx (xx=10, 50).

The volume resistivity of the insulating layer of the moulding of the HVDC cable fitting of the invention is in the range from $10^8$ to $10^{13}$ ohm*cm, in particular in the range from $10^{10}$ to $10^{12}$ ohm*cm.

At values below $10^7$ ohm*cm the electrical conductivity of the insulation layer would be too high, and therefore large power losses would occur by way of the insulator even during normal operation, with associated heating of and damage to the insulation layer. In contrast, at volume resistivities greater than $10^{13}$ ohm*cm the insulation effect of the layer is as high as would be expected from the pure matrix. Space charges arising could then no longer be dissipated.

The voltage-dependent volume resistivity ρ of a layer is measured in accordance with DIN IEC 60093 and DIN EN 61340-2-3:2000 with the aid of a ring electrode (average ring diameter d) on a flat test sample of thickness 1 mm (L), the test sample being placed between two specific measurement probes, and the resistance (R) being determined indirectly by way of the current flowing through the test sample and through a defined test resistance (shunt) connected in series. The volume resistivity is given by the following equation:

$$\rho = R * \pi * (d/2)^2 / L \text{ (ohm*cm)}.$$

The present invention also provides a process for the production of an electrically insulating layer of a cable fitting, where an unhardened elastomer-precursor composition, a crosslinking agent and a field-controlling particulate filler which comprises metal-oxide-containing core-shell particles are homogeneously mixed with one another, and also optionally further additives, to give an insulation-layer-precursor composition, the insulation-layer-precursor composition is introduced into a hollow body which has a cavity with an exterior shape corresponding to the shape of the electrically insulating layer of a cable fitting, and the insulation-layer-precursor composition is hardened in a crosslinking manner by passage of time or introduction of heat and/or of high-energy radiation, and the resultant insulation layer is removed from the hollow body.

Electrically insulating layers for cable fittings which consist of elastomers in the matrix are generally produced in an injection moulding process; in the case of two-component starting-material systems, this is a reaction injection moulding process (RIM process, Reaction Injection Molding). Suitable starting materials for elastomers are mixed with one another here and introduced in liquid form to a hollow body (injection mould), where they undergo crosslinking. After the crosslinking process, they can be removed from the mould and subjected to final construction processes.

The electrically insulating layers of the cable fitting of the invention are also produced in this way. By virtue of the use of the injection moulding process, the electrically insulating layer of the cable fitting is itself formed as moulding.

It is preferable to use, as starting materials for the elastomer, silicone compounds belonging to the following types of silicone resin: RTV2 silicones, LSR silicones or HTV silicones. For this purpose, in the case of two-component systems the corresponding reactive silicone compounds are mixed with crosslinking agents, which are likewise mostly (short-chain) silicone compounds, and also optionally with catalysts and further additives, for example with inert fillers, and this mixture in the liquid state is introduced into the cavity of an injection mould and undergoes crosslinking under the prevailing conditions. The conditions required for this purpose, for example temperature, pressure and reaction time, are known to a person skilled in the art and are selected appropriately for the starting materials and the desired final elastomers. In the case of single-component systems, in contrast, the separate addition of a crosslinking agent is omitted. The crosslinking process can be accelerated by introducing high-energy radiation, for example UV radiation or gamma-radiation.

It is also possible, if necessary, that the cavity of the injection mould has solid components in the form of inserts at a defined location, around which the insulation-layer-precursor composition is cast.

During the crosslinking process, the insulation-layer-precursor composition, which is a mixture of the reactive elastomer-precursor composition with a crosslinking agent and optionally with further additives (preferably at least with a catalyst that accelerates the crosslinking), is hardened by crosslinking and thus converted to the solid elastomeric body which can be removed as moulding from the mould at prescribed temperatures and after a defined dwell time.

The term insulation-layer-precursor composition is used here for the entirety of the starting materials for the production of the insulation layer of the invention. The term elastomer-precursor composition is used for the main constituents of the starting materials for the production of the elastomer (without crosslinking agent and catalyst).

In the present invention, field-controlling particulate fillers in the form of core-shell particles are added to the conventional starting materials for the production of the elastomers before introduction into the cavity of the mould, and are homogeneously distributed in this mixture, and are also maintained in this distribution during introduction into the mould. The resultant mixture is the insulation-layer-precursor composition.

The insulation-layer-precursor composition comprises a quantity of from 0.1 to 25%, based on the total volume of the insulation-layer-precursor composition, of the field-controlling particulate filler. Correspondingly, the proportion of the particulate filler present in the resultant insulation layer or the resultant insulation is also from 0.1 to 25%, based on the volume of the insulation layer or of the insulation.

Materials selected according to the invention as elastomer-precursor composition are preferably silicone compounds which crosslink at low temperature (RTV2), at relative high temperature (HTV) or in the liquid state (LSR). Suitable classes of compound are correspondingly, as already mentioned above, described in more detail in J. Ackermann, V. Damrath, *Chemie und Technologie der Silicone II* [*Chemistry and Technology of the Silicones II*], *Chemie in unserer Zeit* [*Chemistry in our time*], Volume 23, 1989, No. 3, pp. 86-99, VCH Verlagsgesellschaft mbH, Weinheim, or else B. Pachaly, F. Achenbach et. al., *Silicone* [*Silicones*]; from Winnacker/Küchler: *Chemische Technik: Prozesse und Produkte* [*Chemical Technology: Processes and Products*], Volume 5, pp. 1095-1213, Weinheim, WILEY VCH, 2005; they are also obtainable commercially. The appropriate crosslinking agents, catalysts and optionally further additives are likewise described in the stated literature.

The field-controlling particulate fillers in the form of core-shell particles used according to the invention have already been explained in detail above. Reference is made here to those descriptions. Particular importance is attached here to core-shell particles which have not only the desired electrically conductive properties but also density<5 g/cm$^3$, preferably <4 g/cm$^3$, because these can easily be distributed homogeneously in the insulation-layer-precursor composition and can also be retained in this homogeneous distribution during processing to give an insulation layer/insulation.

After the removal of the insulation layer/insulation from the hollow body (the injection moulding in the case of the injection moulding process), an outer conductor (earth potential), and also optionally other components, is/are also provided to the cable fitting in the form of a cable sleeve, a cable end seal, a cable plug or a cable bushing. Inserts can also have already been integrated in advance into the cable fitting in the injection mould. The cable fitting can then be assembled on the HVDC cable. This is achieved by way of example in the case of a cable sleeve by using connection pieces to connect the conductive cable ends (inner conductors) and embedding this cable connection into the completed cable sleeve, advantageously by way of the push-on method or by a shrink-on process. A greatly simplified process also permits the production of the insulation layer/insulation directly on site over the already connected electrical conductors of cable ends by an injection moulding process in a hollow body (injection mould). It is also possible to apply an outer conductor subsequently to the insulation layer of an already assembled cable sleeve.

The present invention therefore also provides an electrically insulating layer on a substrate, where the electrically insulating layer comprises an elastomer and a field-controlling particulate filler, where the latter is metal-oxide-containing core-shell particles and the elastomer is a silicone rubber.

According to the invention, it is preferable that the substrate is an HVDC cable which has at least to some extent an outer electrically conductive surface, i.e. an HVDC cable which in subregions does not have an insulation layer.

According to the present invention, the density of the core-shell particles used is <5 g/cm$^3$, preferably <4 g/cm$^3$. This comparatively low density permits homogeneous distribution of the core-shell particles in the elastomer matrix made of silicone rubber.

Details of the materials used have already been discussed in detail above.

The volume resistivity of the electrically insulating layer of the invention is in the range from $10^8$ to $10^{13}$ ohm*cm. With volume resistivity in the range mentioned, it is assumed that no directional dissipation of space charges that may arise in HVDC cables can occur, but instead that the electrically insulating layer causes diffuse charge distribution, and electrical charges arising can be successively dissipated, with the result that dangerous and hidden accumulations of charge, and spontaneous discharges, do not occur.

The present invention also provides the use of an electrically insulating layer, as described above, as insulating layer in a cable sleeve, a cable end seal, a cable plug or a cable bushing for HVDC cables.

The cable fitting of the invention in the form of a cable sleeve, etc. also has further advantages alongside the advantages already described above of successive dissipation of charge in the event that any space charges arise during the operation of HVDC cables. It is thus possible, if the electrically insulating layer is configured as described here, to omit the formation of an electrically insulating layer that comprises no conductive material of any kind, and also to omit any separate dissipating layer. The use of silicone rubber as preferred material for the elastomer matrix results in high extensibility and elasticity with relatively small compression set values (<20%) for the cable fitting, combined with high tensile strength and with good gas solubility. Because the core-shell particles used according to the invention are highly compatible with a silicone matrix and are amenable to homogeneous incorporation therein, the desired dissipation process, which in the prior art is a function of separate field-controlling layers, can be realised in the technical solution of the invention by a small quantity of conductive material of which the conductivity can be specifically adjusted appropriately for the required conditions, within an electrically insulating layer. The cable fittings of the invention can therefore be produced in an economic and highly effective manner and with maximized appropriate adjustment to the specific requirements, and used as HVDC cable fittings, and applied to HVDC cables by the proven push-on or shrink-on method. Formation of air inclusions or of foreign-substance inclusions between cable and cable fitting is also very substantially avoided via conformity to the cable sections to be connected, and diameters, and power loss can therefore be minimized.

Figure 1:
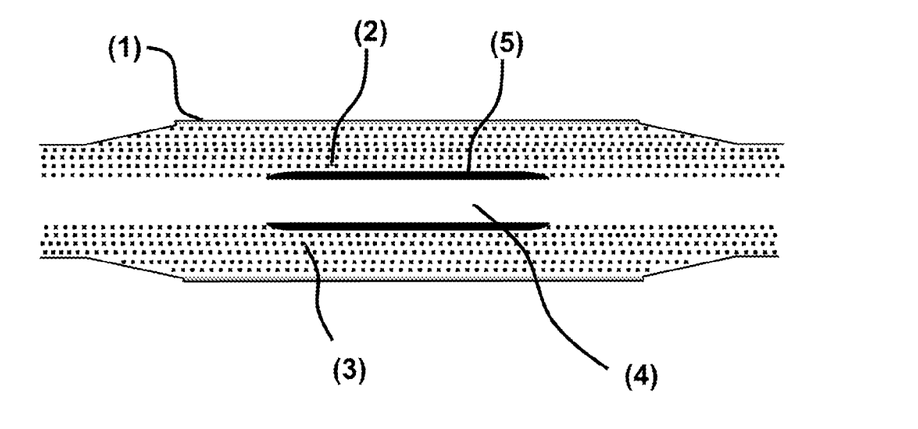
FIG. 1 is a diagram of a cable sleeve of the present invention with an outer conductor layer (1), insulation layers (2) and (3) of the invention, and also an HVDC cable duct (4) with conductive inner layer as connecting element (5).

The present invention will be illustrated below with reference to Examples, but not restricted thereto.

EXAMPLES

Examples 1 to 3

Production of Core-Shell Particles as Fillers 100 g of ground and classified natural mica are suspended in 1900 ml of deionized water. The following are admixed dropwise under acidic conditions with the suspension at 75° C., with stirring: a 50% by weight aqueous $SnCl_4$ solution, HCl and a 35% by weight aqueous $SbCl_3$ solution. The pH is kept constant by simultaneous controlled metering of aqueous sodium hydroxide solution into the mixture. After addition of the entire quantity of the solution, stirring is continued at 75° C. for 30 min, and then a 50% by weight solution of titanium oxychloride is added uniformly at constant pH, with metering of aqueous sodium hydroxide solution into the mixture (addition of titanium oxychloride only in Example 3). Then, with stirring, the mixture is cooled to room temperature and the reaction mixture is neutralized. The resulting pigment is isolated by filtration by way of a suction funnel, washed with water, dried at 140° C. and annealed at 800° C. for about 30 min. This gives a pigment powder of colour from pale grey to yellow-ochre, depending on antimony content. In Examples 1-3 the powder resistivities of the pigments are varied, as shown in Table 1, by varying the antimony content in the tin oxide. The resultant pigment particles have a core made of natural, lamellar mica (particle size<15 µm) and have a shell, precipitated thereon and adhering firmly thereto, made of antimony-doped tin oxide, and also optionally titanium oxide.

The resistivity of a pigment powder is measured as already described above.

TABLE 1

| Example | mol % Sb | mol % Ti | p [ohm · cm] |
| --- | --- | --- | --- |
| 1 | 8 | 0 | 28 |
| 2 | 1.0 | 0 | $2.5 \times 10^6$ |
| 3 | 1.0 | 8 | $3.0 \times 10^9$ |

Examples 4 to 8

Production of Silicone Test Samples

Production of Silicone Plaques Made of Room-Temperature-Crosslinking Silicone (RTV2)

The quantities stated in Table 2 of core-shell particles from Examples 1 to 3 are premixed in a container with the respective proportions of component A of a commercially available RTV2 silicone resin (materials data from manufacturer: A:B=9:1, viscosity of mixture 3500 mPa*s at 23° C., Shore A hardness 45°), and homogenized in a high-speed vacuum mixer (Hauschild) at pressure reduced to 4 mbar and 1600 revolutions per minute for at least 2 minutes. The respective quantities of component B of the same RTV2 silicone resin are then added, and the components are again premixed and homogenized in the high-speed vacuum mixer for at least 1 minute at 4 mbar and 1600 revolutions per minute. The viscous composition is now quickly, within the time permitted by the pot life, poured into a mould which prescribes the geometric dimensions of the test sample. The silicone resin is hardened in the mould for at least 30 minutes at 70° C. After cooling of the mould, the mould is opened and the test samples removed and stored in a dust-free environment.

The silicone test samples are configured as plaques with dimensions 100 mm×100 mm and thickness 5 mm, 2 mm and 1 mm for mechanical testing and, respectively, electrical tests. The quantity and nature of the starting materials is varied according to Table 2.

TABLE 2

| Examples | RTV2, component A [g] | RTV2, component B [g] | Filler Type | Filler quantity [g] | PCV* [%] |
| --- | --- | --- | --- | --- | --- |
| 4 | 108.0 | 12.0 | — | 0.0 | 0.0 |
| 5 | 97.2 | 10.8 | Example 2 | 12.0 | 3.1 |
| 6 | 75.6 | 8.4 | Example 2 | 36.0 | 11.1 |
| 7 | 97.2 | 10.8 | Example 1 | 12.0 | 2.8 |
| 8 | 97.2 | 10.8 | Example 3 | 36.0 | 11.9 |

*PCV = pigment concentration volume

Examples 9-11

Production of Silicone Plaques Made of Liquid Reactive Silicone Compounds (LSR)

The quantity stated in Table 3 of component A of a commercially available silicone resin of type LSR (materials data from manufacturer: A:B=1:1, viscosity of components 100 Pa*s at 20° C., Shore A hardness 40°) is weighed into a container with the respective quantity of core-shell particles from Examples 2 and 3 and the quantity stated in Table 3 of component B of the same LSR silicone resin, and premixed. Care must be taken to minimize introduction of air. The container is placed in a high-speed vacuum mixer (Hauschild), and the mixture is homogenized at pressure reduced to 4 mbar and 2000 revolutions per minute for at least 3 minutes. The highly viscous composition is now quickly, within the time permitted by the pot life, poured into a mould, preheated to 60° C., which prescribes the geometric dimensions of the test sample. The silicone resin is crosslinked in the mould for at least 5 hours at 125° C. After cooling of the mould, the test sample is removed and hardened for a further 14 hours at 125° C. on a glass sheet in an oven.

The silicone test samples are configured as plaques with dimensions 100 mm×100 mm and thickness 5 mm, 2 mm and 1 mm for mechanical testing and, respectively, electrical tests.

Table 3 shows the variation of quantities of silicone components and filler.

TABLE 3

| Example | LSR silicone, component A [g] | LSR silicone, component B [g] | Filler type | Filler quantity [g] | PCV [%] |
| --- | --- | --- | --- | --- | --- |
| 9 | 60.0 | 60.0 | — | 0.0 | 0.0 |
| 10 | 53.9 | 53.9 | Example 2 | 12.2 | 3.1 |
| 11 | 54.3 | 54.3 | Example 2 | 11.5 | 3.3 |
| 12 | 54.3 | 54.3 | Example 3 | 11.3 | 3.3 |
| 13 | 43.2 | 43.2 | Example 3 | 33.6 | 11.3 |

Measurement of Shore A Hardness:

The hardness of elastomers is determined in accordance with DIN ISO 7619-1 by using force provided by a spring for impact-free impression of a steel indenter into the test sample for 15 seconds. The indenter for Shore A determination here has the shape of a conical frustum.

Measurement of Elongation Properties:

Elongation at break and tensile strength are measured on a dumbbell specimen of the type conventionally used for elastomers (DIN 53504 S2), thickness 1 mm, in accordance with ISO 37 by an Instron 5967 test system with traverse velocity 200 mm/min. Because the RTV2 material has a lower degree of crosslinking, it soon deviates from elastic behaviour and, starting at about 30% elongation, begins to exhibit irreversible behaviour. The LSR material, with its higher degree of crosslinking, mostly exhibits elastic behaviour until shortly prior to fracture.

Measurement of Dielectric Strength:

Dielectric strength is measured on test specimens of thickness 2 mm (about 30 mm×40 mm) by a DTA 100 insulation material tester from Baur. The sample is clamped tightly between two disc-shaped electrodes in accordance with ASTM D877, and the test cell is filled with silicone oil (AP 100, Aldrich) so that the test specimen is completely covered, in order to avoid prior discharges through the air. The voltage is increased in steps of 2 kV/s, and the voltage preceding discharge is recorded.

Table 4 shows the corresponding test results.

TABLE 4

| Example | 4 | 5 | 6 | 7 | 8 |
|---|---|---|---|---|---|
| Filler from Example | — | 2 | 2 | 1 | 3 |
| Silicone type | RTV2 | RTV2 | RTV2 | RTV2 | RTV2 |
| PCV [%] | 0.0 | 3.1 | 11.1 | 2.9 | 11.9 |
| Shore A hardness | 35 | 48 | 69 | 48 | 69 |
| Elongation at break [%] (at tensile stress in MPa) | 115 (5.3) | 120 (5.8) | 128 (5.6) | 126 (5.4) | 142 (6.1) |
| Dielectric strength [kV] | 42.2 | 48.9 | 50.7 | 48.5 | 51.2 |

| Example | 9 | 10 | 11 | 12 | 13 |
|---|---|---|---|---|---|
| Filler from Example | — | 1 | 2 | 3 | 3 |
| Silicone type | LSR | LSR | LSR | LSR | LSR |
| PCV [%] | 0.0 | 3.1 | 3.3 | 3.3 | 11.3 |
| Shore A hardness | 33 | 47 | 53 | 55 | 70 |
| Elongation at break [%] (at tensile stress in MPa) | 325 (2.9) | 324 (3.0) | 326 (3.0) | 335 (3.3) | 340 (3.9) |
| Dielectric strength [kV] | 31.2 | 39.8 | 41.2 | 43.4 | 52.8 |

The dielectric strength, in the form of the breakdown voltage determined, increases significantly with the filler loading in the polymer composites shown, with no resultant adverse effect on elastic extensibility. Example 8 in particular, with a filler loading of about 12% by volume, also exhibits substantially higher mechanical strength than the unfilled silicone material. In the case of the LSR silicone, dielectric strength increases by up to 69% with increasing filler loading, and the elastic extensibility of the filled material also increases. In the case of the RTV2 material with its smaller degree of crosslinking, a higher filler loading also leads to up to 21% improvement in dielectric strength. The best electrical properties can be achieved by using the semiconductive filler of Example 3.

The invention claimed is:

1. A cable fitting for HVDC cables, comprising a molding which has multilayer structure and which has an electrically insulating layer that comprises an elastomer and that comprises a field-controlling particulate filler, wherein the field-controlling particulate filler is metal-oxide-containing core-shell particles, the core of the core-shell particles consists of a dielectric material and the shell comprises at least one electrically conductive or electrically semiconductive metal oxide.

2. The cable fitting according to claim 1, that is a cable sleeve, a cable end seal, a cable plug or a cable bushing.

3. The cable fitting according to claim 1, wherein the elastomer is a silicone rubber.

4. The cable fitting according to claim 3, wherein the silicone rubber is a RTV2 silicone rubber, a HTV silicone rubber or a LSR silicone rubber.

5. The cable fitting according to claim 1, having a density of the core-shell particles of <5 g/cm$^3$.

6. The cable fitting according to claim 1, wherein the electrically conductive or electrically semiconductive metal oxide is a doped metal oxide, a metal suboxide or an oxygen-deficient metal oxide.

7. The cable fitting according to claim 6, wherein the metal oxide has been doped with one or more of the elements antimony, indium, tungsten, molybdenum, chromium, cobalt, manganese, iron, cadmium, gallium, germanium, tin, vanadium, niobium, tantalum, cerium, scandium, lanthanum, yttrium, bismuth, titanium, copper, calcium, strontium, barium, aluminum, arsenic, phosphorus, nitrogen, boron, fluorine or chlorine.

8. The cable fitting according to claim 1, wherein the metal oxide is an oxide, mixed oxide or oxide mixture of zinc, tin, germanium, titanium, gallium, indium, antimony, silicon, tungsten, molybdenum, lead, cadmium, calcium, strontium, barium, copper or rhenium.

9. The cable fitting according to claim 1, wherein the electrically insulating layer comprises a quantity of from 0.1 to 25%, based on the volume of the electrically insulating layer, of the field-controlling particulate filler.

10. The cable fitting according to claim 1, wherein the volume resistivity of the electrically insulating layer is in the range from $10^8$ to $10^{13}$ ohm*cm.

11. A process for the production of an electrically insulating layer of a cable fitting according to claim 1, comprising homogeneously mixing with one another an unhardened elastomer-precursor composition, a crosslinking agent and a field-controlling particulate filler which comprises metal-oxide-containing core-shell particles, the core of the core-shell particles consisting of a dielectric material and the shell comprising at least one electrically conductive or electrically semiconductive metal oxide, and also optionally further additives, to give an insulation-layer-precursor composition, introducing the insulation-layer-precursor composition into a hollow body which has a cavity with an exterior shape corresponding to the shape of the electrically insulating layer of a cable fitting, and hardening the insulation-layer-precursor composition in a crosslinking manner by passage of time or introduction of heat and/or of high-energy radiation, and removing the resultant insulation layer from the hollow body.

12. The process according to claim 11, wherein the insulation-layer-precursor composition is introduced into the hollow body by means of an injection molding process.

13. The process according to claim 11, wherein the unhardened elastomer-precursor composition is a RTV2 silicone composition, a HTV silicone composition or a LSR silicone composition.

14. The process according to claim 11, wherein, based on the volume of the insulation-layer-precursor composition, the quantity present therein of the field-controlling particulate filler is 0.1 to 25%.

15. The process according to claim 11, wherein the density of the field-controlling particulate filler is <5 g/cm$^3$.

16. An electrically insulating layer on a substrate, comprising an elastomer and a field-controlling particulate filler, where the field-controlling particulate filler is metal-oxide-containing core-shell particles, the core of the core-shell particles comprises a dielectric material and the shell comprises at least one electrically conductive or electrically semiconductive metal oxide, and the elastomer is a silicone rubber.

17. The electrically insulating layer according to claim 16, having a density of the metal-oxide-containing core-shell particles <5 g/cm$^3$, and the distribution of these in the elastomer is homogeneous.

18. The electrically insulating layer according to claim 16, having a volume resistivity of $10^8$ to $10^{13}$ ohm*cm.

19. The electrically insulating layer according to claim 16, wherein the substrate is an HVDC cable having, at least partially, an electrically conductive surface.

20. An insulating layer in a cable sleeve, a cable end seal, a cable plug or a cable bushing for HVDC cables, comprising in said insulating layer, end seal, plug or bushing an electrically insulating layer according to claim 16.

* * * * *